July 9, 1940.   G. B. COLLINS   2,207,117
DISPLAY DEVICE
Filed Aug. 3, 1938   2 Sheets-Sheet 1
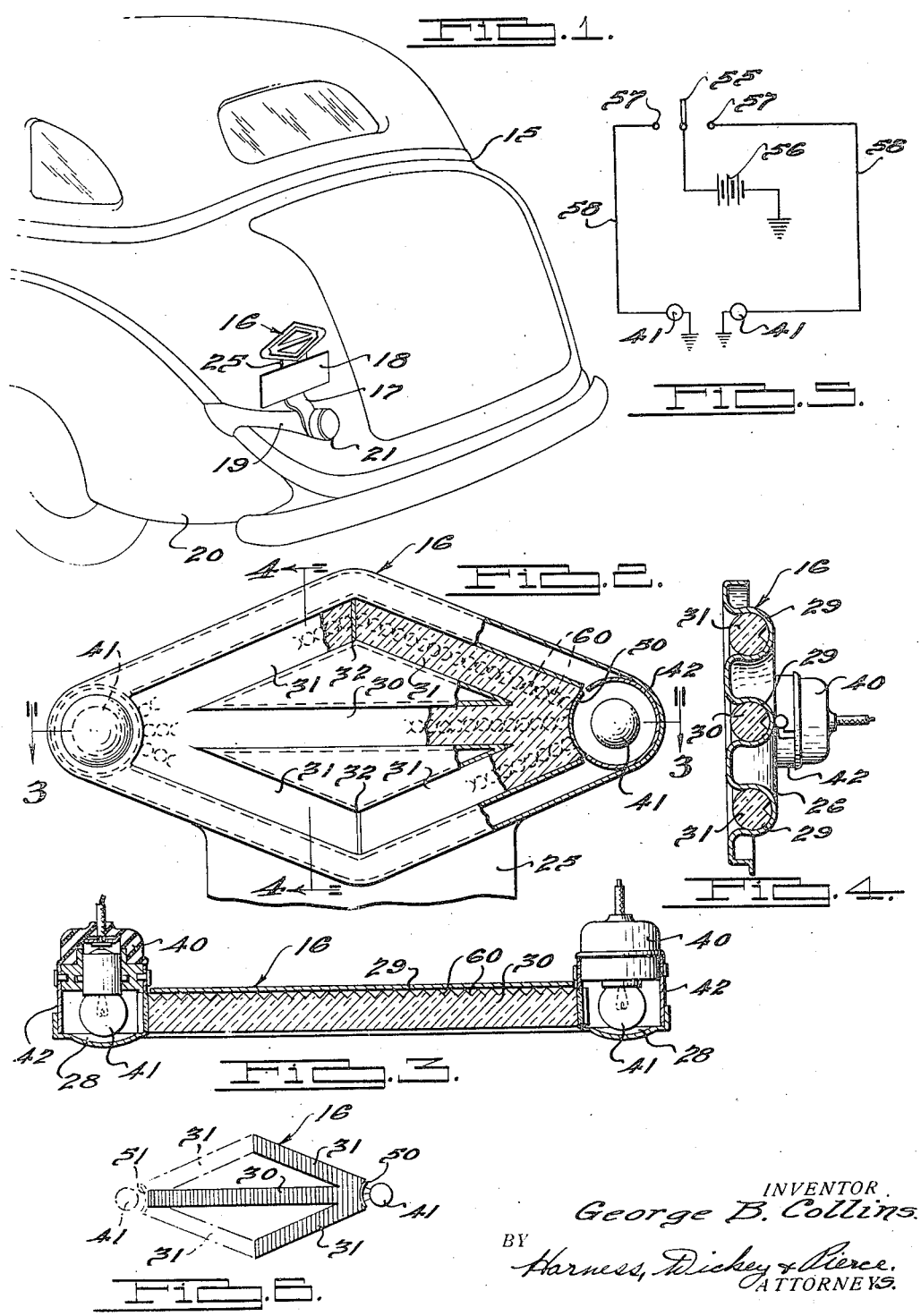
INVENTOR
George B. Collins
BY Harness, Dickey & Pierce
ATTORNEYS

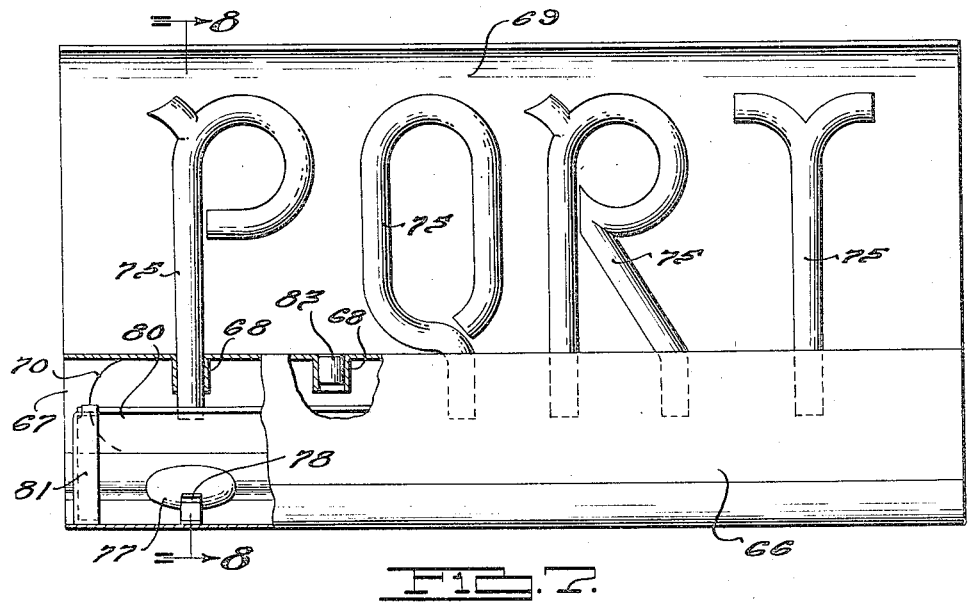
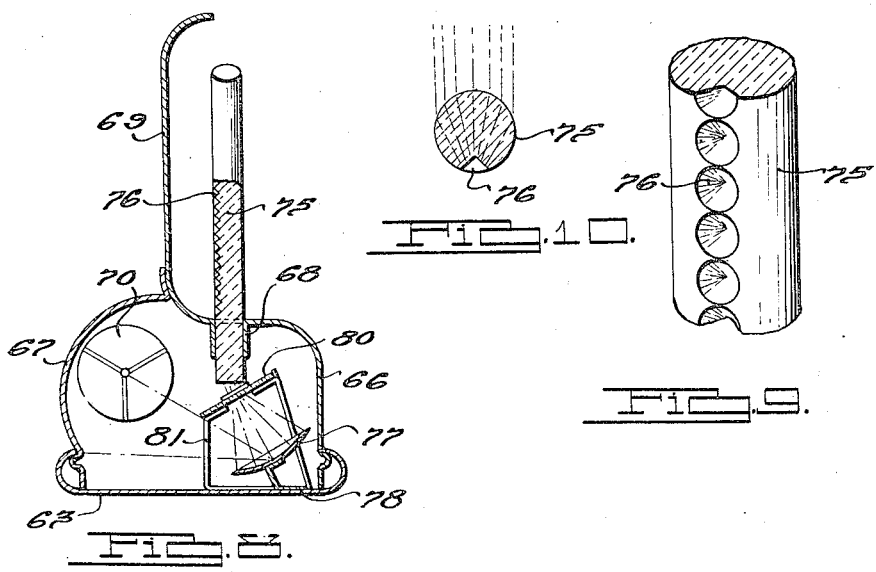

Patented July 9, 1940

2,207,117

UNITED STATES PATENT OFFICE 2,207,117

DISPLAY DEVICE

George B. Collins, Notre Dame, Ind.

Application August 3, 1938, Serial No. 222,887

6 Claims. (Cl. 40—130)

This invention relates to display devices. More particularly, it relates to illuminated display devices in which transparent members are shaped to form the indicia constituting the display and are so constructed and arranged in combination with a source of light as to disseminate the lumination therefrom.

It has long been customary to construct signs composed of a sheet or pane of glass which has indicia etched upon the surface thereof and to illuminate the indicia by means of introducing light into one edge of the pane of glass. The etched indicia constitute means for scattering the illumination within the glass pane. Signs of this type have not proven particularly satisfactory for several reasons. In the first place, the glass from which they are formed is not sufficiently transparent to provide an efficient device, a large amount of the light introduced at the edge of the pane being absorbed by the glass itself. Secondly, the indicia constituting but a small portion of the surface of the glass pane merely serve to disseminate a very small amount of the light actually introduced into the edge of the pane. As a result, a very small percentage of the light from the source used is available for display purposes.

The present invention contemplates the provision of a display device wherein the indicia are formed from rod-like sections of highly transparent plastic material, the rod-like portions being shaped to form the particular indicia desired. The rod-like sections of plastic material are provided with scattering centers along one side thereof and means are provided for introducing light into the rod-like sections from one or both axial ends thereof. These scattering centers serve to disseminate a very substantial proportion of the light introduced and thus make available a very substantial proportion of the light from the source available for display purposes.

The present invention contemplates the provision of a display device construction of highly transparent plastic material which is considerably more transparent than glass and consequently, results in a material reduction in the loss of light due to absorption.

Still further and more specifically the invention contemplates the location of the light scattering centers and the cross-sectional form of the rod in such a way that the disseminated light is concentrated in a forward direction.

Still further, and more specifically, the invention contemplates the provision of a display device intended for use as a turn indicator on automotive vehicles in which a sign of the generic type disclosed herein may be employed for the purpose of indicating to vehicles or pedestrians the direction of an intended turn by a driver.

Many other and further objects, features, and advantages of the present invention will become clearly apparent from the following specification when considered in connection with the accompanying drawings forming a part thereof.

In the drawings:

Figure 1 is a fragmentary rear perspective view of an automotive vehicle body embodying a turn indicator constructed in accordance with the teachings of the present invention.

Figure 2 is an enlarged rear elevational view of the turn indicator shown in Figure 1 with portions broken away to illustrate in detail the construction and arrangement of parts thereof.

Figure 3 is a transverse sectional view taken substantially on the line 3—3 of Figure 2 illustrating in further detail the construction and arrangement of parts of the turn indicator shown in Figure 2.

Figure 4 is a sectional view taken substantially on the line 4—4 of Figure 2 illustrating in detail the cross-sectional configuration of the improved turn indicator.

Figure 5 is a diagrammatic view illustrating one form of circuit connection which may be employed to operate the turn indicator illustrated in the preceding figures.

Figure 6 is a diagrammatic view illustrating the manner in which the turn indicator is illuminated by lighting one of the lights thereof.

Figure 7 is a front elevational view of a modified form of the display device embodying the improvements of the present invention with portions broken away to illustrate the interior construction and arrangement of parts.

Figure 8 is a transverse sectional view taken substantially along the line 8—8 of Figure 7 illustrating in detail the cross-sectional configuration of the display device shown therein.

Figure 9 is an enlarged fragmentary perspective view illustrating in detail one manner in which the rod-like members constituting the display device may be preformed to provide light scattering centers.

Figure 10 is a more or less diagrammatic transverse sectional view through one of the rod-like members illustrating the manner in which the rod-like member serves to concentrate the light disseminated by the scattering centers.

With more particular reference to the drawings, it will be readily appreciated that the specific embodiments of the invention illustrated therein are merely illustrative of the generic inventive concept presented in the present application and defined in the subjoined claims and, therefore, many and various different embodiments thereof will readily be apparent to those skilled in the art.

It is well recognized that light introduced into one axial end of a highly transparent rod-like member will be retained within the member and transmitted to the opposite axial end thereof substantially undiminished except for the absorption of the material of which the rod is formed. In the event the rod is formed of very highly transparent material, as is contemplated herein, and in the event the rod has an extremely smooth surface, light introduced into one end thereof would be transmitted substantially undiminished to the other end in accordance with the well known physical law of total internal reflection. This, of course, is the result of the fact that practically all of the light entering the axial end of the rod does not meet the surface of the rod at a sufficiently small angle of incidence to escape from the rod and is, therefore, reflected back into the rod.

It has been discovered that in the event a substantially continuous row of light scattering centers are provided along one side of the rod, the light rays striking these light scattering centers will be scattered in such a way that they will strike the surface at an angle less than the angle of total internal reflection and thus be disseminated from the rod making the rod itself appear to glow or be illuminated when light is introduced at one axial end thereof. It will be obvious that by properly constructing and arranging these light scattering centers along the rod, substantially all of the light introduced into the axial end of the rod may be disseminated therefrom at any desired points thus making available, for the purpose of illuminating the rod, a very substantial proportion of the light from the source used thereby creating an illuminated display device of relatively high efficiency.

It will be readily appreciated that the rod may be made to appear very brilliantly illuminated by so locating the scattering centers on a rod having a particular cross-section that a focusing of the disseminated light within a predetermined zone is obtained.

While it will be readily obvious that the invention is susceptible of many and various widely different useful applications, in Figures 1 to 6 of the drawings is shown a construction in which the invention has been applied to turn indicators for automotive vehicles.

In this specific embodiment of the invention, the device may conveniently be mounted upon some portion of the rear end of an automotive vehicle 15 and in the specific form shown, it will be seen that the turn indicator, generally indicated as 16, is supported on and anchored to the conventional bracket 17 which also serves to support a license plate 18. This bracket 17, as is conventional in automotive vehicle constructions, is carried by a rearwardly projecting tail lamp bracket 19 supported upon a rear fender 20 of the vehicle 15. This tail lamp bracket 19, as is customary, serves to mount a tail lamp 21. A turn indicator is preferably secured to the license plate supporting bracket 17 by means of a support member 25 which serves to support a backing plate 26 in which are mounted the various members making up the turn indicator construction.

This backing plate 26, in the embodiment of the invention shown, is preformed to provide an external configuration substantially that of an equilateral parallelogram and is shaped to provide lamp housings 28 at each of the opposite ends thereof. The body of the support member 26 is preformed to provide grooves 29 which are adapted to receive the transparent plastic rod-like members which make up the sign construction. In the form of the invention shown, transparent rod-like members making up the sign construction may be conveniently formed of plastic material by injection molding to provide a central or horizontal bar 30 with angularly rearwardly projecting portions 31 at each of the opposite ends thereof whereby to provide a construction representing a double ended arrow with the central member 30 constituting the shaft of the arrow and the rearwardly projecting portions 31 constituting the bar thereof. The adjacent ends of the adjacent members 31 are preferably separated by an opaque filling member 32 which serves to preclude the dissemination of light from the members 31 through these ends thereof. It will be readily apparent that the members 31 each is integrally joined with the member 30 at a point closely adjacent each of the lamp housings 28 thereby facilitating the introduction of light into the axial ends of these members. A pair of lamp sockets 40 of conventional construction, each serving to mount an electric light bulb 41, are anchored in position with respect to the lamp housings 28 in order to position the lamp bulbs 41 in such a position with respect to the reflector as to project light into the axial ends of the rods 30 and 31 which serve to make up the sign.

Each of these lamp sockets 40 is provided with a generally elliptical reflector 42 which serves to cooperate with the lamp housings 28 and socket 40 to preclude the escape of light from the bulb in any direction other than into the axial ends of the rods 30 and 31. Consequently, it will be readily appreciated that substantially all of the light from the bulbs which is not absorbed by the reflector, housing, and socket members will be directed into the interior of the rod-like members 30 and 31 which constitute the sign.

As is clearly seen by reference to Figure 2, the axial ends of these rod-like members 30 and 31, adjacent each of the bulbs 41, are formed generally arcuate in order to equalize the amount of light which is projected into each of the members. In order to facilitate the entrance of the light into the rod-like members, it has been found desirable to secure glass strips 50 and 51 over the axial ends of these members by means of suitable highly transparent cement. This insures a smooth highly transparent surface at the axial end of the rod-like members. These glass members 50 and 51 may, if desired, constitute filters and in the specific embodiment of the invention illustrated in Figures 1 to 6 of the drawings, the filter 50 may conveniently be formed of green glass while the filter 51 is preferably formed of red glass.

An illustrative form of circuit diagram is shown in Figure 5. This construction includes a switch arm 55 which is directly connected to one terminal of the battery 56 of the vehicle. This switch arm 55 may be moved to connect one side of the battery with either of two contacts 57 each of which contacts 57 are connected with one side of each of the lamps 41 by means of wires 58. One side of the battery is connected to the vehicle frame as is conventional and the opposite sides of the lamps 41 are similarly grounded to the frame.

From the above described construction, it will be obvious that swinging the switch arm 55 into contact with either one or the other of the contacts 57 will serve to selectively illuminate either one or the other of the lamps 41.

The effect produced in the sign is clearly illustrated in Figure 6 of the drawings wherein the lamp 41 at the right hand side of the figure has been illuminated and thereby causes illumination of the entire member 30 and the members 31 at the right hand side of the device. Inasmuch as the filter member 50 is green, the members 30 and 31 will appear as green. Similarly, when the lamp 41 at the left hand side of Figure 6 is illuminated by swinging the switch member 55 in contact with the opposite contact 57, the entire member 30 and the members 31 at the left hand side of Figure 6 will be illuminated as red. In this way it will be seen that either a red or a green arrow will be produced in the display device depending upon whether it is the desire of the driver to indicate either a right or left hand turn.

The rod-like members 30 and 31 are provided along their rear sides with a row of generally conical, rough walled depressions 60 which serve to provide light scattering centers in order to disseminate the light entering the axial ends of the rods. While the series of rough walled, generally conical depressions in the rear side of the rod-like members 30 and 31 have been found to provide a particularly effective means for scattering the light introduced into the interior of the rod, it will be obvious to those skilled in the art that many and various different means may be employed in order to obtain the desired light scattering effects, such for example, as scratching the surface of a rod or preforming it in any suitable way in order to provide a rough or irregular surface, or moulding to include light reflecting particles within the body of the rod.

In Figures 7 to 10, inclusive, is illustrated a modified form of the invention in which the basic inventive concept herein presented is applied to a stationary display or advertising sign construction. In this form of the invention, the device comprises a sheet metal supporting structure comprising a base member 65 and a pair of side wall members 66 and 67 which together form an enclosed housing having a length sufficient to accommodate the indicia making up the particular desired sign, as hereinafter explained in detail.

The side wall member 66 extends upwardly from the base, as shown in Figure 8, and is then bent to provide a horizontal portion having a plurality of flanged apertures 68 therein and from this horizontal portion extends upwardly to provide a backing member 69 to shield and protect the indicia hereinafter described.

While a plurality of electric light bulbs may be used for sources of light in connection with the embodiment of the sign shown, it has been found preferable to utilize a conventional tubular electric light 70 having a length nearly as great as the length of the sign construction as a whole and extending parallel to the rear wall member 67. The rear wall member 67 is highly polished on its interior surface and is shaped to provide a generally parabolic reflector which will concentrate the light from the tubular lamp 70 in a direction downwardly and forwardly toward the junction of the front wall member 66 and the base member 65. The indicia constituting the sign construction are formed of highly transparent, clear rod-like members 75 and each of the indicia is provided with one or more portions adapted to seat in and extend through one or more of the apertures 68 in the horizontal portion of the front wall member 66. A fragmentary portion of one of these rod-like members is illustrated in enlarged perspective view in Figure 9 of the drawings and it will be seen that these members have a plurality of generally conical, rough walled depressions which may be molded directly therein or which may be formed by the point of a drill. These depressions, as has been described above, constitute a substantially continuous series of light scattering centers which extend throughout the exposed portions of the rod-like members 75 and which serve to cause the rod-like members to be illuminated substantially throughout the entire length thereof when light in introduced into one of the axial ends thereof. A series of elliptical reflectors 77 is disposed generally below each of the apertures 68 and directly in the path of the light concentrated by the reflector 67. These reflectors each serve to direct and concentrate the light upon the axial end of the rod-like members 75 which extend through the apertures 68 in order that a substantial proportion of the light from the source will be introduced into the axial ends of each of the rod-like members which project through the apertures 68.

These reflectors 77 may conveniently be supported on bracket members 78 permanently secured to the base 65.

A filter comprising a colored glass member 80 may conveniently be mounted upon suitable brackets 81 in order to regulate the color of the light introduced into the axial ends of the rod-like members and thereby cause illumination of the indicia in any particular desired color.

It will be noted that the flanged apertures 68 are spaced at substantially uniform intervals throughout the length of the display device in order that the indicia may conveniently be removably mounted in the display and to facilitate the removal of the particular indicia shown and the substitution therefor of other indicia as may be desired. In the event the configuration of the particular indicia employed is such that all of the apertures 68 are not actually used, a suitable plug 83 may be inserted in the openings not employed in order to prevent the escape of light therethrough.

One particularly important feature of the present invention which is inherent in the display constructions shown in both of the above described modifications is clearly illustrated by the sectional view of Figure 10 wherein it is apparent that light introduced into the transparent rod-like members 75 will be disseminated by the scattering centers 76 along the rear side of the rod. All of the light disseminated by these scattering centers which is directed out through the rod toward the front of the sign will be generally focused and concentrated as a result of the lenticular effect inherently obtained from the cross-sectional configuration of the rod, and the proper location with respect to the surface of the rod of the light scattering centers. This serves to concentrate the light scattered by the scattering centers and materially serves to increase the brilliance and effectiveness of the sign construction as a whole.

It will be readily appreciated from the foregoing description that but two illustrative embodiments of the invention have been disclosed herein. Obviously, many other and further modifications of the basic inventive concept defined in the subjoined claims will be clearly apparent to those skilled in the art.

What I claim is:

1. A display device comprising a generally cylindrical transparent rod having light scattering points therealong and means for introducing light into the interior of said rod through one axial end thereof, said light scattering points being located along the side of said rod whereby said rod will tend to focus the light emanating therefrom.

2. A display device comprising a generally cylindrical transparent rod having light scattering points therealong, a source of illumination, and means for introducing light from said source into the axial end of said rod, said light scattering points being located along the side of said rod whereby said rod will tend to focus the light emanating therefrom.

3. A display device comprising a generally cylindrical transparent rod having light scattering points therealong, a source of illumination, means for introducing light from said source into the axial end of said rod and filter means interposed between said source of illumination and said rod whereby to control the color of the light entering said rod, said light scattering points being located along the side of said rod whereby said rod will tend to focus the light emanating therefrom.

4. In a display device comprising a generally cylindrical transparent rod having light scattering points therealong, a pair of sources of light, one adapted to introduce light into the interior of said rod from one axial end thereof and the other adapted to introduce light into said rod from the other axial end thereof, said light scattering points being located along one side of said rod whereby said rod will tend to focus the light emanating therefrom.

5. A display device comprising a transparent rod having a portion of the surface thereof preformed to provide light scattering centers therealong, a pair of sources of light, one adapted to introduce light into the interior of said rod from one axial end thereof, the other adapted to introduce light into the interior of said rod from the other axial end thereof, and a filter interposed between each of said sources of light and said rod.

6. A display device comprising a transparent rod having a portion of the surface thereof preformed to provide light scattering centers therealong, a pair of sources of light, one adapted to introduce light into the interior of said rod from one end thereof, the other adapted to introduce light into the interior of said rod from the opposite end thereof, and a filter interposed between each of said sources of light and said rod, said filters being of different colors and means for selectively illuminating said lights.

GEORGE B. COLLINS.